July 20, 1948.   J. C. GOLDBACH   2,445,523
FISHING LURE
Filed May 8, 1947
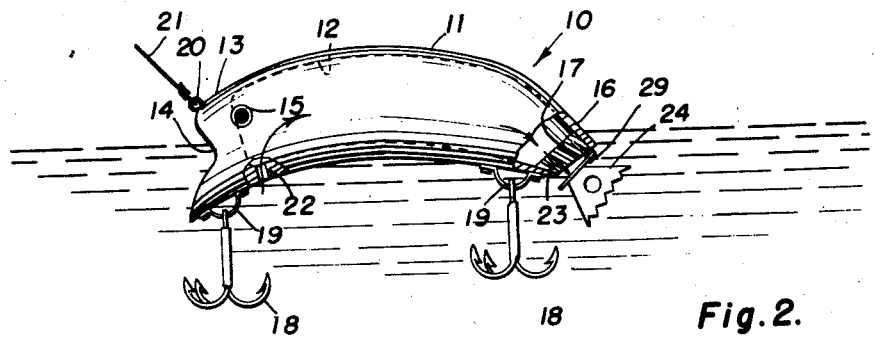
Fig. 1.
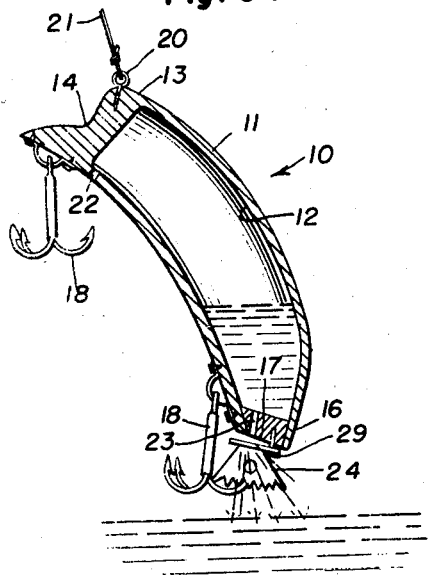
Fig. 3.
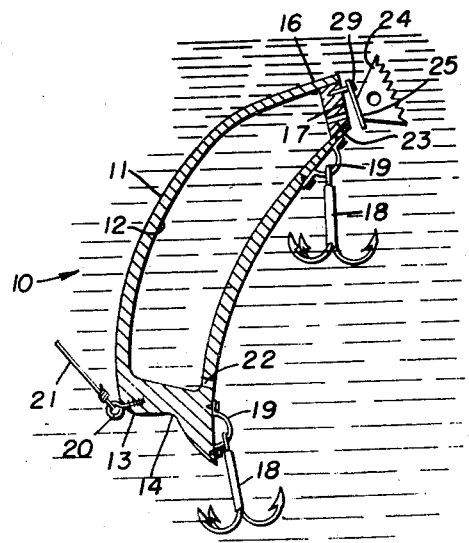
Fig. 2.
Fig. 4.
Inventor
John C. Goldbach
By Clarence A. O'Brien
and Harvey B. Jacobson
Attorneys Patented July 20, 1948

2,445,523

UNITED STATES PATENT OFFICE 2,445,523

FISHING LURE

John C. Goldbach, Jacksonville, Fla.

Application May 8, 1947, Serial No. 746,721

2 Claims. (Cl. 43—46)

This invention relates to new and useful improvements and structural refinements in fishing lures, more specifically in a fishing lure constituting the subject matter of my co-pending application for patent, Ser. No. 710,683, filed on November 18, 1946.

While experimenting with a fishing lure constructed in accordance with the principles disclosed in said application, it has been found that the same lends itself to certain structural improvements, whereby the functional and utilitarian features thereof are considerably enhanced. It is, therefore, the principal object of the instant invention to provide a device of the character herein described, in which such improvements are embodied.

A further object of the invention is to provide a fishing lure which, as in the original invention, will exhibit life-like motion when it is placed in use, and which, in addition to its movement, will also simulate the characteristic of breathing.

Another object of the invention is to provide a fishing lure which is simple in construction, realistic in appearance, which may be easily and conveniently manipulated, and which will readily lend itself to economic manufacture.

With the above more important objects in view, and such other objects as may become apparent as this specification proceeds, the invention consists essentially of the arrangement and construction of parts as illustrated in the accompanying drawings, in which:

Figure 1 is a side elevation of the invention, partially broken away, illustrating the position thereof shortly after it is cast on the water;

Figure 2 is a longitudinal, cross sectional view of the invention, showing the same in a position when it has commenced to sink below the water level;

Figure 3 is a cross sectional view, similar to that shown in Figure 2, but illustrating the invention as being withdrawn from the water; and Figure 4 is a perspective view of a tail-piece used in the invention.

Like characters of reference are used to designate like parts in the specification and throughout the several views.

Referring now to the accompanying drawings in detail, the invention consists of a fishing lure designated generally by the reference character 10, the same embodying in its construction an elongated, curved body 11 formed with a longitudinally extending chamber 12.

The body 11, as a whole, is designed to simulate the appearance of a fish and, if desired, the head portion 13 thereof may be grooved, as at 14, to resemble the appearance of the fish's mouth and the eyes 15 may be painted thereon, as will be clearly apparent. The tail portion 16 of the body 11 terminates in an obliquely disposed end wall 17, as is best shown in Figures 1, 2 and 3.

A suitable gang fish-hook 18 is movably attached to each of the end portions 13, 16 of the body 11, this being accomplished by freely mounting the fish-hooks on suitable arcuate straps 19 with which the body is provided, as will be clearly understood.

In addition, the head portion 13 of the body 11 is equipped with an eye 20 whereby the lure, as a whole, may be conveniently attached to a fishing line 21.

The essence of novelty in the invention resides in the provision of the aforementioned chamber 12 and in the formation of a water inlet aperture 22 in the head portion 13 and of an air outlet aperture 23 in the tail portion 16 of the lure body. These apertures communicate with the chamber 12, as will be clearly apparent.

In addition, a tail-piece 24 is movably attached to the tail portion 16, the tail-piece 24 consisting of a flat plate 25 provided on one side thereof with a rigidly mounted, rearwardly projecting fin 26, as is best shown in Figure 4. The rear edge of this fin may be notched to provide a series or a row of teeth 27, while the plate 25 is formed with an aperture 28 through which a nail or screw 29 may extend into the end wall 17 of the body 11, whereby the tail piece 24 is movably mounted in position.

It will be noted that the plate 25 of the tail-piece is disposed adjacent the air outlet aperture 23, and when the invention is placed in use, the lure, as a whole, may be cast upon the water, as shown in Figure 1.

By virtue of the particular arcuate configuration of the body 11, combined with the distribution of weight which causes the head portion 13 of the lure to be "heavy," the head portion will commence to sink and water will enter through the aperture 22 into the chamber 12 and will gradually displace the air in the chamber so that the air is expelled through the outlet aperture 23, as shown in Figure 2.

This action will be accompanied by the formation of a considerable amount of bubbles emanating from the aperture 23, whereby the lure will simulate the characteristics of breathing.

Furthermore, the escape of air through the aperture 23 will impart a considerable "fluttering" movement to the tail-piece 24, thereby contributing to the realistic appearance of the invention, as a whole.

After the chamber 12 is completely filled with water, the lure should be withdrawn and held in suspension above the water level for a short period of time, whereby the water in the chamber 12 will be permitted to drain through the opening 23. Thereupon, the invention will be in readiness for the next cycle of operation.

It may be stated that the length of time required for the submerging action of the lure may be increased or decreased as desired by simply increasing or decreasing the size of the opening or apertures 22, 23, as will be clearly understood.

It is believed that the advantages and use of the invention will be clearly apparent from the foregoing disclosure, and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. In a fish lure including a body having a rear end wall formed with a fluid outlet aperture, an agitable tail-piece comprising a plate disposed substantially in parallelism to said wall immediately adjacent said aperture, a fin provided centrally on the rear surface of said plate and extending rearwardly at right angles thereto, and a fastener movably attaching said plate to said end wall.

2. In a fish lure, an arcuate and hollow body having a front end portion formed with a fluid inlet aperture and a flat rear end wall formed with a fluid outlet aperture, said apertures effecting flow of fluid through said body and said outlet aperture being of substantially lesser diameter than the inside diameter of said body, an agitable tail piece comprising a flat plate disposed substantially in parallelism with and movably attached to said wall immediately behind said outlet aperture, a fin secured centrally on the rear surface of said plate and extending rearwardly therefrom, said plate being provided with an opening, and a fastener extending freely through said opening into said end wall.

JOHN C. GOLDBACH.

REFERENCES CITED

The following references are of record in the file of this patent:

UNITED STATES PATENTS

| Number | Name | Date |
| --- | --- | --- |
| 1,489,043 | Reinewald | Apr. 11, 1924 |
| 1,499,819 | Goble | July 1, 1924 |
| 1,745,006 | Chapeau | Jan. 28, 1930 |
| 2,027,069 | Sorenson | Jan. 7, 1936 |
| 2,028,050 | DeWitt | Jan. 14, 1936 |
| 2,229,239 | Davis | Jan. 21, 1941 |
| 2,229,369 | Buettner | Jan. 21, 1941 |
| 2,305,865 | Goyings | Dec. 22, 1942 |
| 2,317,781 | Lehto | Apr. 27, 1943 |